United States Patent
Callaghan

(10) Patent No.: US 11,240,157 B1
(45) Date of Patent: Feb. 1, 2022

(54) ADAPTIVE QUALITY OF SERVICE MARKING

(71) Applicant: Amazon Technologies, Inc., Seattle, WA (US)

(72) Inventor: Stephen Callaghan, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 147 days.

(21) Appl. No.: 15/059,017

(22) Filed: Mar. 2, 2016

(51) Int. Cl.
*H04L 12/851* (2013.01)
*H04L 29/06* (2006.01)
*H04L 12/911* (2013.01)

(52) U.S. Cl.
CPC ............. *H04L 47/24* (2013.01); *H04L 69/22* (2013.01); *H04L 47/70* (2013.01); *H04L 69/16* (2013.01)

(58) Field of Classification Search
CPC ..... H04L 47/10; H04L 47/70; H04L 47/2408; H04L 47/2441; H04L 47/724; H04L 47/805; H04L 47/822; H04L 65/80
See application file for complete search history.

(56) References Cited

U.S. PATENT DOCUMENTS

| | | | | |
|---|---|---|---|---|
| 7,860,006 | B1* | 12/2010 | Kashyap | H04L 41/0893 370/235 |
| 8,000,245 | B2 | 8/2011 | Rochon et al. | |
| 2003/0156578 | A1* | 8/2003 | Bergenlid | H04L 29/06 370/352 |
| 2007/0201481 | A1* | 8/2007 | Bhatia | H04L 65/1083 370/395.2 |
| 2007/0297417 | A1* | 12/2007 | Cohen | H04L 45/04 370/395.42 |
| 2008/0020775 | A1* | 1/2008 | Willars | H04L 47/10 455/445 |
| 2008/0175146 | A1* | 7/2008 | Van Leekwuck | H04L 47/762 370/230 |
| 2010/0118871 | A1* | 5/2010 | Liu | H04L 45/00 370/389 |
| 2011/0038259 | A1* | 2/2011 | Bharrat | H04L 47/20 370/230 |
| 2014/0219088 | A1* | 8/2014 | Oyman | H04N 21/23439 370/231 |
| 2015/0009826 | A1* | 1/2015 | Ma | H04L 47/2408 370/235 |

(Continued)

OTHER PUBLICATIONS

Blake et al., "An Architecture for Differentiated Services", RFC 2475 (Dec. 1998), https://tools.ietf.org/html/rfc2475.

(Continued)

*Primary Examiner* — Oussama Roudani
(74) *Attorney, Agent, or Firm* — Klarquist Sparkman, LLP

(57) ABSTRACT

Technologies for adaptively classifying network packets for quality of service (QoS) are provided herein. Adaptive classifiers track network packets transferred in data flows and network sessions, and apply various QoS classifications to the packets. An adaptive classifier can apply different QoS markings to packets in a data flow based on data flow metadata, such as the age of the data flow and/or the amount of data transmitted in the data flow. An adaptive classifier can assign various priority levels to network packets during different phases of a network session. Routers that receive the packets can prioritize transmission of the packets based on the applied QoS markings or assigned priority levels.

12 Claims, 10 Drawing Sheets

(56) References Cited

U.S. PATENT DOCUMENTS

| | | | | |
|---|---|---|---|---|
| 2015/0009930 A1* | 1/2015 | Rapaport | ............ | H04L 1/1825 |
| | | | | 370/329 |
| 2015/0029848 A1* | 1/2015 | Jain | .................. | H04L 47/6215 |
| | | | | 370/235 |
| 2016/0174188 A1* | 6/2016 | Kim | .................... | H04L 65/105 |
| | | | | 455/458 |
| 2017/0272474 A1* | 9/2017 | Stille | ................. | H04L 65/1016 |

OTHER PUBLICATIONS

Branden et al., "Integrated Services in the Internet Architecture: an Overview", RFC 1633 (Jun. 1994), https://tools.ietf.org/html/rfc1633.

* cited by examiner

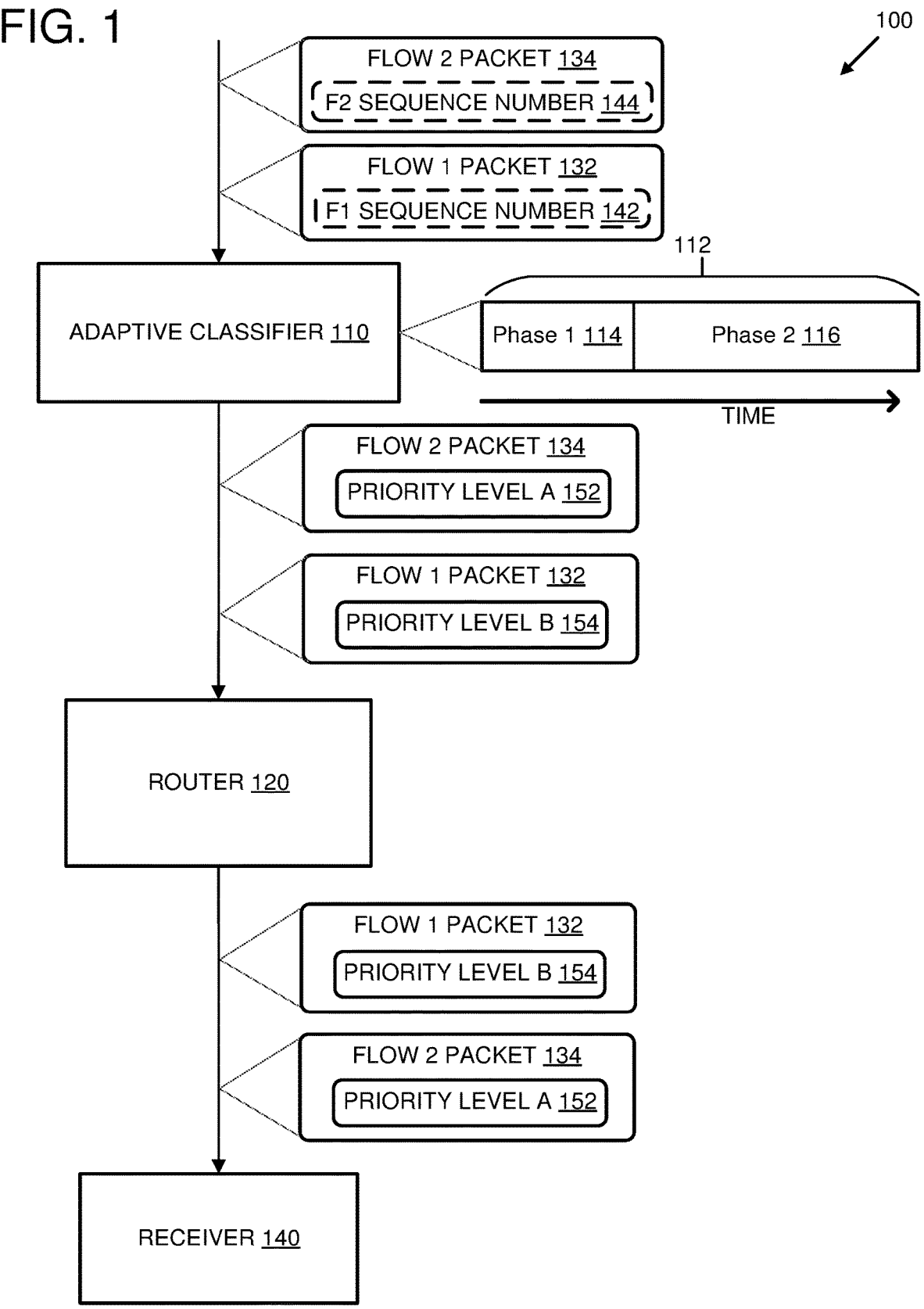

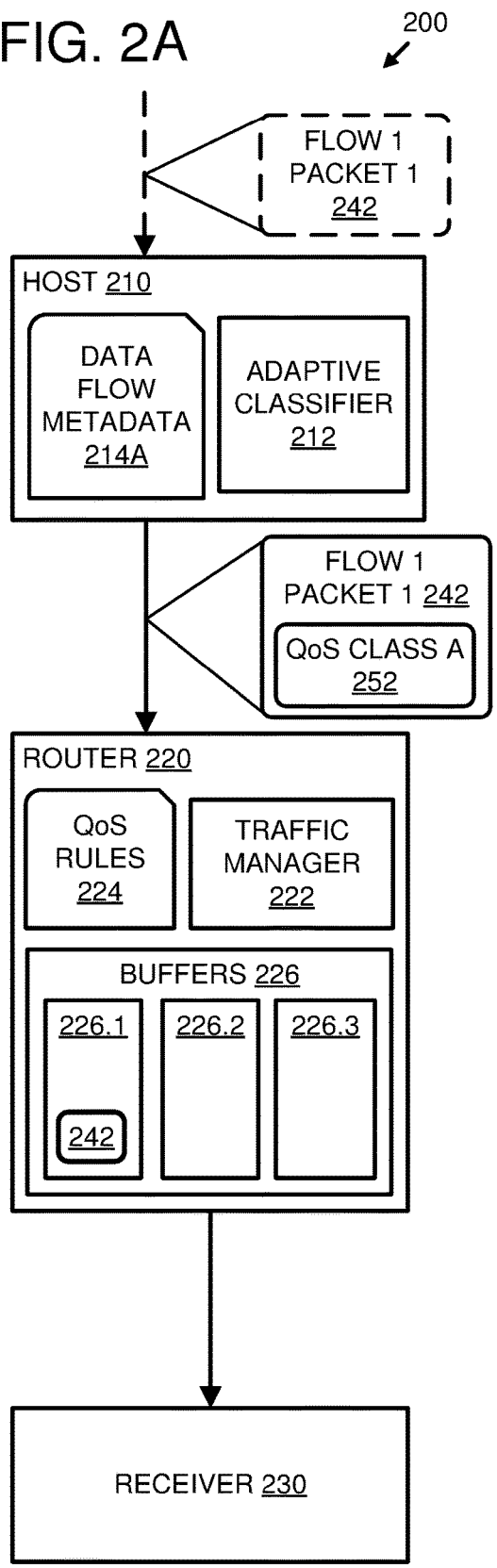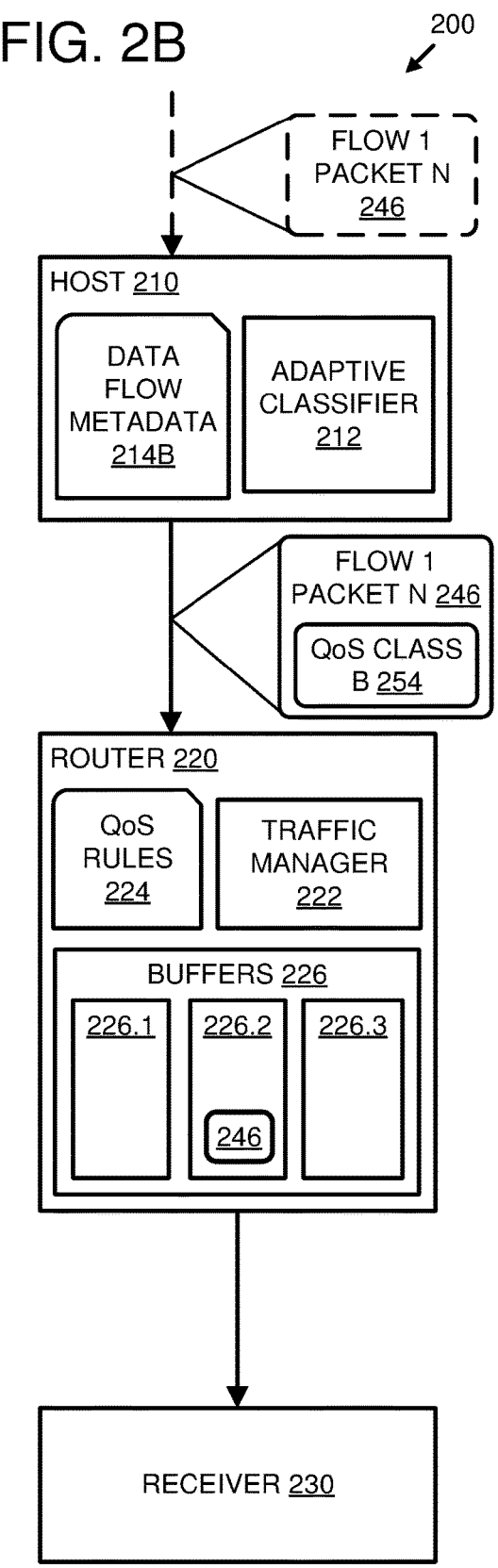

ADAPTIVE QUALITY OF SERVICE MARKING

BACKGROUND

Quality of service (QoS) schemes are used in some computer networks to give different priority levels to different types of network traffic. One example QoS scheme is Differentiated Services (DiffServ). In DiffServ, packets are classified and marked in order to receive different prioritizations from network nodes that receive and transmit the packets. DiffServ classifies packets based on the values of header fields, such as source or destination address, DS field, protocol ID, source port and destination port numbers, and other information. In Integrated Services (IntServ), another QoS scheme, applications negotiate resource reservations with routers in a network before transmitting network traffic via the routers in order to obtain guaranteed traffic flow rates.

BRIEF DESCRIPTION OF THE DRAWINGS

FIG. 1 is an example system diagram showing a system configured to adaptively prioritize packets in multiple data flows using different quality of service markings.

FIG. 2A is an example system diagram illustrating an adaptive classifier applying a quality of service class to a packet based on data flow metadata, and a router prioritizing the packet based on the quality of service class.

FIG. 2B is an example system diagram illustrating an adaptive classifier applying a different quality of service class to a subsequent packet based on data flow metadata, and a router prioritizing the subsequent packet based on the different quality of service class.

DETAILED DESCRIPTION

Figure 3:
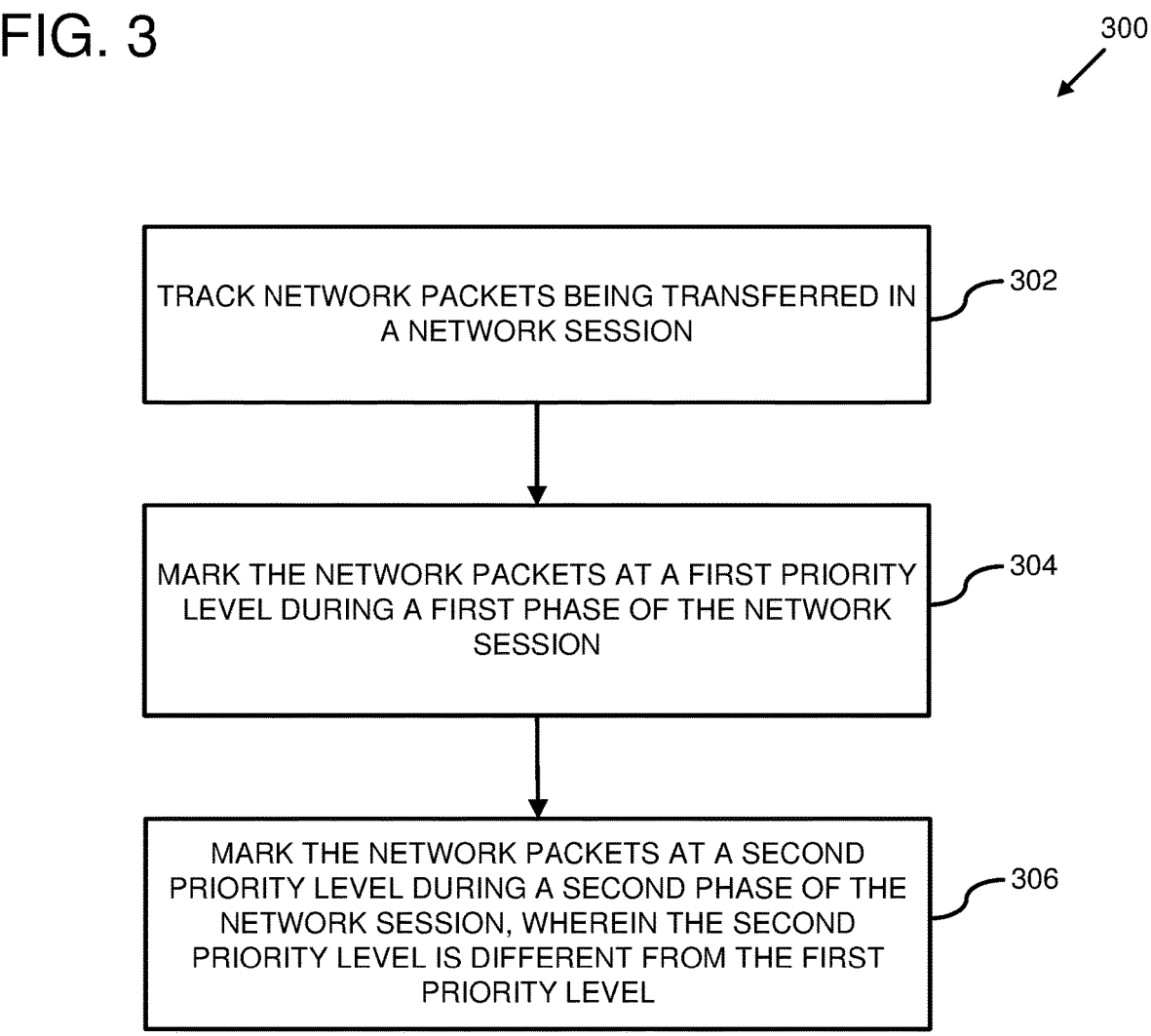
FIG. 3 is a flowchart of an example method of adaptively marking network packets at different priority levels during different phases of a network session.

Preexisting quality of service (QoS) schemes, such as DiffServ, cannot differentiate between data flows in a network that are of the same traffic type. For example, DiffServ would give the same priority to a short-lived RESTful API call and a long-lived, bulk HTTP transfer when they are both transmitted using Transmission Control Protocol (TCP) port 443. Although IntServ provides QoS on a per-traffic flow basis, it does so by negotiating resource reservations for traffic flows with routers up front. This requires extensive connection setup time that is not feasible in many modern networks.

Furthermore, preexisting QoS schemes cannot adaptively change the priority of packets in a data flow. Traditional QoS schemes also cannot assign different priorities to packets transmitted in different phases of a network session.

At least some embodiments of the technologies described herein solve these problems by adaptively classifying network traffic. The technologies described herein use adaptive classifiers to track metadata about data flows in a network and to apply various QoS classifications or markings to packets in the data flows based on the data flow metadata. Routers in the network can prioritize transmission of the packets in the data flows based on the QoS classifications or markings applied to the packets by the adaptive classifiers.

Thus, network traffic priority can be modified using timing of a network session or other attributes of the network session so as to give some packets higher priority than others. In one example, packets used to establish a new session are given priority over other packets, such as packets that deliver data after the session has been established. There are multiple techniques that can be used to give priority during a session setup. Examples include analyzing metadata as described above. Another example is to track a number of bytes and assume that a certain number of the bytes are session setup information.

In a particular example, a first priority can be given to network packets transmitted during a slow-start phase of a protocol (e.g., TCP) in order to fill a transmission pipeline before another phase of the protocol, such as a congestion avoidance phase, is reached.

FIG. 1 is a diagram of example system 100, wherein an adaptive classifier 110 is configured to assign various priority levels to packets in multiple data flows and transmit the packets to a router 120. Router 120 is configured to prioritize transmission of the packets to a receiver 140, based on the priority levels assigned by adaptive classifier 110. FIG. 1 illustrates two example packets in system 100: flow 1 packet 132 and flow 2 packet 134. Flow 1 packet 132 is a packet in a first data flow, "flow 1," and flow 2 packet 134 is a packet in a second data flow, "flow 2."

The adaptive classifier 110 is configured to receive data packets in one or more data flows. After the adaptive classifier 110 receives a packet in a data flow, the adaptive classifier 110 assigns a priority level to the packet based on an amount of data transmitted in the data flow. The amount of data can be an amount of data transmitted in the data flow from the time of the data flow's creation up to the time the packet is received.

Alternatively, the amount of data can be an amount of data transmitted in the data flow since a certain point in time, other than the time of the data flow's creation. For example, if a rate of data transmitted in the data flow does not rise above a specified level for a specified period of time, the starting time for tracking data transmission can be moved forward, or a counter tracking the amount of transmitted data can be reset. In this way, the data transmission amount can be effectively reduced or reset.

The adaptive classifier 110 can assign a first priority level to received packets in a data flow when the amount of data transferred in the data flow is less than or equal to a specified threshold. When the amount of data transmitted in the data flow exceeds the specified threshold, the adaptive classifier 110 can assign a second priority level to received packets in the data flow. Alternatively, the adaptive classifier 110 can assign a first priority level to received packets for a data flow when the data flow is in a first phase and a second priority level to received packets for the data flow when the data flow is in a second phase. The first phase may be an initial phase of the data flow, such as a phase in which a connection and/or session is established with the receiver 140. Packets transmitted during such an initial phase may be given a higher priority level than packets transmitted in subsequent phases after the connection and/or session has been established.

In some embodiments, the transition from the first phase to the second phase is associated with an amount of data transmitted in the data flow. For example, a data flow can be considered to be in a first phase when less than a specified amount of data has been transmitted in the data flow and the data flow can be considered to be in a second phase when the specified amount of data has been transmitted in the data flow or more than the specified amount of data has been transmitted in the data flow.

FIG. 1 illustrates an example set of phases 112, comprising a first phase ("phase 1") 114 and a second phase ("phase 2") 116, used by the adaptive classifier 110 when determining priority levels for received packets. The phases progress from left to right in accordance with the illustrated timeline. For example, after receiving the packet 132, the adaptive classifier 110 can determine that the example data flow "flow 1" is in the second phase 116 and assign a priority level B 154 to packet 132 based on that determination. After receiving the packet 134, the adaptive classifier 110 can determine that the example data flow "flow 2" is in the first phase 114 and assign a priority level A 152 to the packet 134. Although two phases are illustrated, other numbers of phases are also possible.

The amount of data that has been transmitted in a data flow can be determined by tracking the number of packets transmitted in the data flow. For example, the adaptive classifier 110 can track the number of packets received in a given data flow by allocating a counter when an initial packet in a data flow is received and incrementing the counter when subsequent packets in the data flow are received. When a packet is received in a data flow, the adaptive classifier 110 can increment a counter for the data flow and compare the value of the counter to a specified threshold. If the value of the counter is less than or equal to the specified threshold, then the adaptive classifier 110 assigns a first priority level to the packet. If the value of the counter exceeds the specified threshold, then the adaptive classifier 110 assigns a second priority level to the packet.

Alternatively, the counter can be allocated with an initial value equal to the specified threshold and decremented when subsequent packets are received. In such embodiments, the adaptive classifier 110 can assign a first priority level to packets when the value of the counter is greater than zero and the adaptive classifier 110 can assign a second priority level to packets received after the value of the counter reaches zero.

The priority levels, specified threshold, and/or initial counter value can be specified by a system administrator. In some embodiments, the priority levels, specified threshold, and/or initial counter value are defined during a configuration of the system 100. In different or further embodiments, the priority levels, specified threshold, and/or initial counter value can be specified and/or changed while the system 100 is running.

Optionally, packets can contain sequence numbers when they are received by the adaptive classifier 110. In such cases, the adaptive classifier 110 can use the packet sequence numbers to determine the amount of data that has been transmitted in a data flow. For example, the packet 132 can contain a sequence number 142 that indicates the amount of data transmitted in the "flow 1" example data flow as of the creation of the packet 132. Similarly, the packet 134 can contain a sequence number 144 that indicates the amount of data transmitted in the example data flow "flow 2" as of the creation of the packet 134. In such cases, the amount of data transmitted in a given data flow can be determined using the packet sequence numbers instead of using a counter for the data flow.

The router 120 receives packets from the adaptive classifier 110 with the assigned priority levels and prioritizes transmission of the received packets to the receiver 140 based on the assigned priority levels. For example, the packet 132 is received by the router 120 before the packet 134. However, because the packet 132 is assigned the priority level B 154 and the packet 134 is assigned the priority level A 152 (which in this example is a higher priority level than priority level B 154), the router 120 transmits the packet 134 to the receiver 140 before transmitting the packet 132. Although FIG. 1 illustrates the router 120 transmitting both the packet 132 and the packet 134 to the receiver 140, the router 120 can be configured to transmit packets to multiple receivers.

Although two priority levels are illustrated, other numbers of priority levels are possible. Configurations comprising more than one adaptive classifier, more than one router, and/or more than one receiver are also possible.

In any of the examples described herein, an adaptive classifier can be configured to receive packets, identify the data flow or data flows to which the packets belong, apply various QoS classifications, or priority levels, to the packets based on data flow metadata and/or network session phases, and transmit the modified packets to one or more routers.

An adaptive classifier can comprise dedicated networking hardware, such as a network interface card. In different or further embodiments, the adaptive classifier can comprise software that interfaces with networking hardware, such as all or part of an operating system's networking functionality.

The adaptive classifier can be installed on a computing device, such as a server, that generates packets for one or more data flows. In such an embodiment, the adaptive classification can be part of a packet generation process. Alternatively, the adaptive classifier can receive the packets from a separate component on the computing device that generates the packets.

In another embodiment, the adaptive classifier can be installed on a separate server, such as a network switch or firewall device, that is deployed in a network between one or more originating computing devices, where packets are generated, and one or more routing devices. In such an embodiment, the adaptive classifier receives packets from the one or more originating computing devices and classifies them before passing them on to the one or more routers.

A server, or other computing device, containing an adaptive classifier can be referred to as a "host."

In any of the examples described herein, a router can be an electronic device attached to a network and capable of creating, receiving, and/or transmitting information over one or more communications channels. For example, a router can be any computer or other communications device, such as a networking switch, operable to selectively route network traffic, such as packets in data flows, between other electronic devices connected to the router.

A router can be configured to prioritize packets based on various QoS classifications or priority levels. A router can determine a transmission priority of a given packet by examining one or more packet fields that specify a QoS classification or priority level. For example, such a field can be the differentiated services code point (DSCP) in the differentiated services field (DS field) of an Internet Protocol (IP) packet header. In such configurations, packets with higher transmission priorities can be transmitted before packets with lower priorities.

In some embodiments, a router will ignore QoS classifications on incoming packets when it is possible to handle all incoming packets simultaneously. In these embodiments, the router uses the QoS classifications to prioritize packet transmission when the router experiences network congestion. Network congestion can occur, for example, when the router does not have enough available bandwidth to transmit all pending packets simultaneously.

A router can also be referred to as a "routing device" or a "network routing device."

In any of the examples described herein, a receiver can be any computing device configured to receive information over one or more network communication channels. A receiver can receive packets in one or more data flows transmitted by one or more routers.

In any of the examples herein, a packet (or network packet) is a formatted unit of data transmitted in a computer network. In networks comprising one or more routers, such as network switches, packets can be uniform blocks into which transmitted data is grouped. A packet can comprise a header and a payload. A packet header can be used by computing devices in the network, such as routers, to direct the packet to its destination. Once the packet arrives at its destination, the packet's payload is extracted by one or more processes. Packets can be nested within one another. For example, the payload of one packet for one protocol may contain another packet for another protocol.

In any of the embodiments described herein, a data flow can be any series of related communications in a computer network. For example, for communications in a network transmitted using the Internet Protocol Suite, a data flow can be a TCP connection, identified by a source IP address, a source port, a destination IP address, and a destination port. Alternatively, a data flow can be identified by a source IP address and a destination IP address, in which case the data flow would constitute all IP communications from the source to the destination. In some cases, a data flow is identified by a source IP address, or a source IP address and source port combination. In other cases, a data flow is identified by a destination IP address, or a destination IP address and destination port combination.

Other strategies for identifying data flows are also possible. For example, network card MAC addresses and/or communication protocol types specified in packet headers (DNS, VOIP, FTP, etc.) can also be used to differentiate data flows.

A data flow can also be referred to as a "network data flow."

FIG. 2A is a diagram illustrating an example system 200, in which an adaptive classifier 212 applies a QoS classification 252 to a packet 242 in an example data flow "flow 1."

The system 200 comprises a host 210 configured to create or receive packets in one or more data flows. The host 210 can be a server, or other computing device, connected to a network. In cases where the host 210 generates the packets for a data flow, the host 210 can be referred to as an originating server for the data flow. Alternatively, the host 210 can receive packets for a data flow from another computing device via a network connection. For example, FIG. 2A shows the packet 242 as optionally being received by the host 210. Similarly, FIG. 2B shows a packet 246 as optionally being received by the host 210.

The host 210 comprises the adaptive classifier 212 configured to modify packets in data flows to indicate QoS classifications of the packets. For example, the adaptive classifier 212 modifies the packet 242 to indicate that the packet 242 is classified as the QoS classification A 252.

The host 210 also comprises data flow metadata 214A. The data flow metadata 214A can comprise data that can be used to determine an age of a data flow and/or an amount of data transmitted in a data flow. The adaptive classifier 212 can use the data flow metadata 214A when determining which QoS classification to apply to a packet.

For example, the data flow metadata 214A may contain an initial sequence number for data flow "flow 1" that can be used by the adaptive classifier 212 to determine an amount of data transferred in the data flow "flow 1." The adaptive classifier 212 can determine the amount of data transferred in the data flow "flow 1" by calculating a difference between the initial sequence number and a sequence number of the packet 242. The data flow metadata 214A may contain a counter with a value that is incremented or decremented as packets in the data flow "flow 1" are received or created. The data flow metadata 214A may contain a timer that is started when a first packet for data flow "flow 1" is received or created. The data flow metadata 214A may contain a timestamp that is generated when an initial packet for data flow "flow 1" is received or created. Such a timestamp can be used by the adaptive classifier 212 to determine an age of the data flow "flow 1" by calculating a difference between the timestamp generated for the initial packet and a timestamp generated when packet 242 is created or received.

The adaptive classifier 212 can compare such calculated differences, counter values, and/or timer values to one or more specified thresholds to determine a QoS classification for the packet 242. For example, the adaptive classifier 212 can select a first QoS classification if a difference between an initial sequence number and a sequence number of packet 242 is less than or equal to a specified threshold. If the difference exceeds the specified threshold, then the adaptive classifier 212 can select a second QoS classification.

In another example, the adaptive classifier 212 can select a first QoS classification if a difference between an initial timestamp and a timestamp associated with the packet 242 is less than or equal to a specified threshold. If the difference between the timestamps exceeds the specified threshold, then the adaptive classifier 212 can select a second QoS classification.

In yet another example, the adaptive classifier 212 can select a first QoS classification for the packet 242 if a packet counter or timer associated with the data flow has a value that is less than the specified threshold. If the value of the counter or timer meets or exceeds the specified threshold, then the adaptive classifier can select a different QoS classification for the packet 242.

QoS classifications can be selected based on other factors in addition to the specified threshold. For example, factors such as data flow source, data flow destination, and data flow protocol can also affect the selection of a QoS classification. Additional packet fields, such as one or more flags indicating that the packet is sensitive to latency, can be considered as well.

Once a QoS classification for the packet 242 has been selected, the adaptive classifier 212 modifies the packet 242 to indicate the QoS classification, represented as the QoS classification A 252 in FIG. 2.

A router 220 is configured to receive packets from the host 210 and transmit the received packets to one or more destinations, such as a receiver 230. The router 220 comprises a traffic manager 222 that is configured to prioritize transmission of the received packets based on the QoS classifications assigned to the packets by the adaptive classifier 212. The priorities (or qualities of service) for the packets can be based on one or more QoS rules 224. For example, the QoS rules 224 can specify relative priorities between the various QoS classifications.

Based on the QoS rules 224, the traffic manager 222 can prioritize the received packets using buffers 226 associated with different priorities. For example, in FIG. 2A, the traffic manager 222 uses the QoS rules 224 to determine a priority associated with the QoS classification A 252, assigned to the packet 242. Based on the determined priority, the traffic manager 222 places the packet 242 in a buffer 226.1, which is associated with the determined priority.

FIG. 2B is another example diagram illustrating the system 200, in which the adaptive classifier 212 applies a different QoS classification B 254 to a subsequent packet 246 in the example "flow 1" dataflow. In FIG. 2B, data flow metadata stored in the host 210 is labeled as 214B since, at the time that the subsequent packet 246 is received by the host 210, the dataflow metadata may contain one or more values that are different from values contained in the data flow metadata 214A. For example, a packet counter or timer for the data flow "flow 1" may have a different value when the packet 246 is received, than when the packet 242 was received. Contrastingly, a stored initial sequence number or initial timestamp may have the same value, but a calculated difference based on a packet sequence number of the packet 246, or a timestamp associated with the packet 246, would have a different value than a difference calculated for the packet 242.

The adaptive classifier 212 compares the one or more calculated differences, counter values, and/or timer values for the packet 246 to the one or more specified thresholds to determine a QoS classification for the packet 242. The adaptive classifier 212 then modifies the packet 246 to indicate that the packet 246 is associated with the QoS classification B 254, which is different from the QoS classification A 252, and transmits the packet 246 to the router 220.

Based on the QoS rules 224, the traffic manager 222 determines a priority associated with the QoS classification B 254. The traffic manager 222 places the packet 246 in a buffer 226.2, associated with the determined priority. In this example, the QoS rules 224 associate the QoS class A 252 and the QoS class B 254 with different priorities. Thus, the packets 252 and 254 are placed in different buffers by the traffic manager 222.

In transmitting packets to the receiver 230, the router 220 can be configured to transmit packets in buffers with higher priorities before transmitting packets with lower priorities. In some embodiments, packets in a given buffer are transmitted only when buffers associated with higher priorities are empty. For example, if the QoS classification A 242 is associated with a higher priority than the QoS Classification B 254, then packets in the buffer 226.1 may be transmitted to the receiver 230 before packets in the buffer 226.2 are transmitted. In such a scenario, the packet 242 may be transmitted to the receiver 230 before co-pending packets stored in the buffer 226.2 are transmitted. Whereas, the packet 246 may not be transmitted to the receiver 230 until after co-pending packets stored in the buffer 226.1 are transmitted.

Although the only packets illustrated in FIGS. 2A-B are in the data flow "flow 1," the adaptive classifier 212 and the router 220 can receive packets for other data flows as well. Packets for the other data flows can be classified by the adaptive classifier 212 and prioritized by the router 220, along with packets for the data flow "flow 1." Although two QoS classifications are illustrated (A 252 and B 254), other numbers of QoS classifications are also possible. For example, a third classification may be defined and associated with a third priority that is associated with a buffer 226.3.

FIG. 3 is a flowchart of an example method 300 of adaptively marking network packets at different priority levels during different phases of a network session. Example method 300 can be performed by an adaptive classifier in any of the example systems described herein.

At 302, network packets being transferred in a network session are tracked. The tracking can comprise receiving packets at an adaptive classifier and determining which of the received packets are associated with a particular network session. The tracking can comprise monitoring packet numbers of packets in the network session. The tracking can comprise comparing packet numbers to a threshold number. In some embodiments, the threshold number can be provided by an application that generated data contained in at least some of the network packets transferred in the network session.

The tracking can comprise monitoring a time difference between an initial packet transferred in the network session and subsequent packets transferred in the network session. The tracking can comprise decrementing a value of a counter associated with the network session as packets are transferred in the network session.

A network session can be a series of communications from a source computer to a destination computer over a network. A network session can be a series of communications between the source and destination that are associated with a context or persistent state. A data flow can also be a network session.

An adaptive classifier can determine which network session associated with a received packet by examining the contents of the received packet. For example, the adaptive classifier can inspect header information of the packet to determine a source identifier, a destination identifier, a protocol, and/or traffic type that can be used to identify a network session. Other session identifiers, such as cookies and user identifiers, are also possible.

A network session can comprise multiple phases. A phase can represent a stage or period in the lifetime of the network session. Example network session phases include: session establishment, payload transmission, and session termination. Phases of a network session can be based on a networking protocol associated with the session. For example, in an embodiment where the network session is a TCP connection, establishment of the connection can be a first phase, transmissions over the connection after establishment and before termination can be a second phase, and termination of the connection can be a third phase.

Alternatively, phases of the network session can be based on amounts of data transferred during the session. For example, the first amount of data transferred in the network session can constitute a first phase. Data transferred in excess of the first amount can constitute a second phase. In a further embodiment, data transferred in excess of a second amount can constitute a third phase. Different numbers of phases than those described in these examples are also possible.

At 304, network packets are marked at a first priority level during a first phase of the network session. The adaptive classifier can mark packets at a particular priority level by modifying the contents of the packets, such as one or more packet fields or packet header information.

At 306, network packets are marked at a second priority level, which is different from the first priority level, during a second phase of the network session.

In some embodiments, the marking of the packets at the first priority level can occur when a tracked packet number is less than or equal to a threshold number. In such embodiments, the marking of the packets at the second priority level can occur when the tracked packet number exceeds the threshold number.

In some embodiments, the marking of the packets at the first priority level can occur when a value of a counter, that is decremented as packets are transferred in the network session, is greater than or equal to a specified threshold. In such embodiments, the marking of the packets at the second priority level can occur when the value of the counter is less than a specified threshold.

Assigning different priority levels to packets during different network session phases can allow transmissions sent during certain phases to be emphasized over transmissions sent during other phases. For example, in an embodiment where the first phase is a session establishment phase, prioritizing packets sent during the first phase over packets sent during subsequent phases can reduce the overall time that it takes to establish new sessions in the network. Prioritizing packets sent during connection establishment phases can have the effect of de-prioritizing the transmission of packets for sessions that have already been established.

Figure 4:
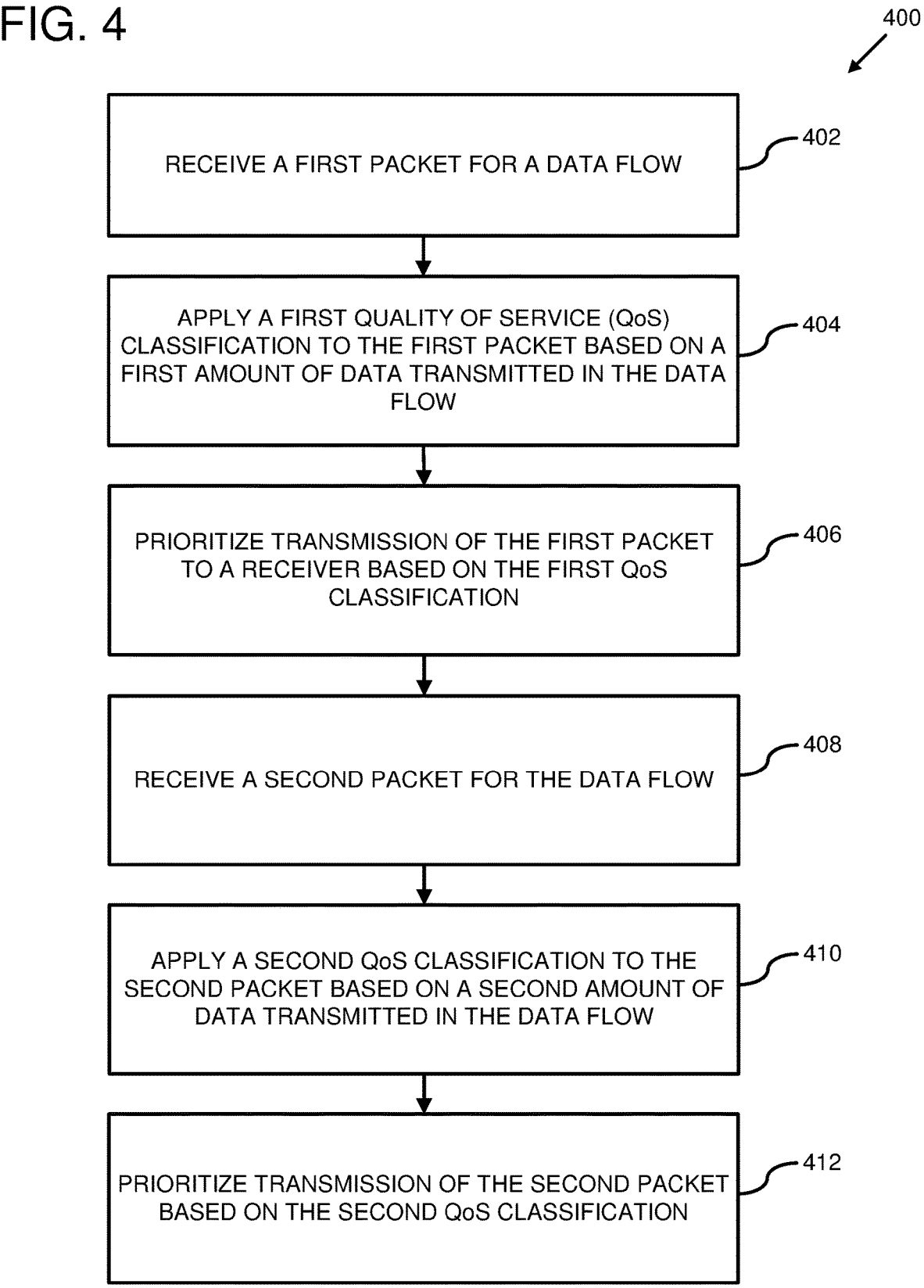
FIG. 4 is a flowchart of an example method of applying different quality of service classifications to packets in a data flow based on different amounts of data transmitted in the data flow.

FIG. 4 is a flowchart of an example method 400 of applying different QoS classifications to packets in a data flow based on different amounts of data transmitted in the data flow.

At 402, a first packet for a data flow is received. The first packet can be received from another computing device over a network connection. Alternatively, the first packet can be received from a separate process running on the same server as the component performing the receiving. The term "first packet" is used to indicate that the packet is the packet received first as part of example method 300. The received "first packet" is not necessarily an initial packet transmitted in the data flow.

At 404, a first QoS classification is applied to the first packet based on a first amount of data transmitted in the data flow. The first amount of data can be determined by keeping track of the number of packets that have been transmitted in the data flow. For example, a counter associated with the data flow can be incremented or decremented as packets for the data flow are received. Alternatively, in embodiments where the packets contain increasing packet numbers, the amount of data transmitted can be determined by calculating a difference between the first packet's packet number and a packet number of an initial packet transmitted in the data flow.

In other embodiments, a packet can contain a sequence number that represents a number of data units (such as bytes) that have been transmitted in the data flow as of the time the packet containing the sequence number was created. In such embodiments, the sequence number can be used to determine the amount of data transmitted in the data flow. If an initial sequence number for the data flow had a value of zero, then the sequence number can represent the amount of transmitted data. If the initial sequence number for the data flow had a value other than zero, then the amount of transmitted data can be determined by calculating a difference between the initial sequence number and the sequence number of the received packet.

The applying the first QoS classification to the first packet can comprise comparing the first amount of data transmitted in the data flow to a specified threshold and selecting a QoS classification for the packet based on the comparison. For example, the first QoS classification may be selected if the first amount of data transmitted in the data flow is less than or equal to the specified threshold. Applying the first QoS classification to the first packet can comprise modifying the contents of the first packet. For example, an indication of the first QoS classification can be applied to the first packet by modifying a header section of the first packet.

At 406, transmission of the first packet to a receiver is prioritized based on the first QoS classification. The transmission of the first packet can be prioritized relative to other packets that are pending on the server performing the prioritization and transmission at a same time that the first packet is pending on the server. The other packets may be packets in the same data flow as the first packet and/or packets in one or more other data flows.

An outbound transmission pipeline of the server may be too small to transmit the first packet and the other pending packets without delay. In such a case, the server can use the QoS classifications of the first packet and the other pending packets to determine an order of packet transmission. For example, if the first QoS classification has a higher priority than another QoS classification applied to one or more of the other pending packets, then the first packet will be transmitted to the receiver before the one or more of the other pending packets are transmitted.

At 408, a second packet for the data flow is received. Although the two packets described are referred to as a "first packet" and a "second packet," the two packets are not necessarily received consecutively. Other packets in the data flow can be received between the receiving of the first packet and the receiving of the second packet.

At 410, a second QoS classification, different from the first QoS classification, is applied to the second packet based on a second amount of data transmitted in the data flow. The second amount of data transmitted in the data flow can be determined in a manner similar the determination of the first amount of data transmitted in the data flow at 404. The first and second amounts of data can represent total amounts of data or packets transmitted in the data flow at the times that the first and second packets are received, respectively. In such an embodiment, since the second packet is received after the first packet is received, the second amount of data can be larger than the first amount of data.

Applying the second QoS classification can comprise comparing the second amount of data to a specified threshold and selecting the second QoS classification based on the comparison. For example, the second QoS classification may be selected because the second amount of data exceeds the specified threshold.

The applying the second QoS classification to the second packet can comprise modifying the contents of the second packet. For example, an indication of the second QoS classification can be applied to the second packet by modifying a header section of the second packet.

In some embodiments, the applying the first QoS classification at 404 and the applying the second QoS classification are performed by networking hardware of a computing device, such as a network interface card.

At 412, a transmission of the second packet is prioritized based on the second QoS classification. The transmission prioritization process of the second packet can be similar to the transmission prioritization process of the first packet at 406. However, since the second QoS classification is different from the first QoS classification, the second packet can have a transmission priority different from the transmission priority of the first packet.

For example, if the first QoS classification has a higher priority than the second QoS classification, then the second packet will have a lower transmission priority than the transmission priority of the first packet. In such an embodiment, data transmitted in the data flow up to a specified threshold can be transmitted with a higher priority than data transmitted in the data flow in excess of the specified threshold.

Figure 5:
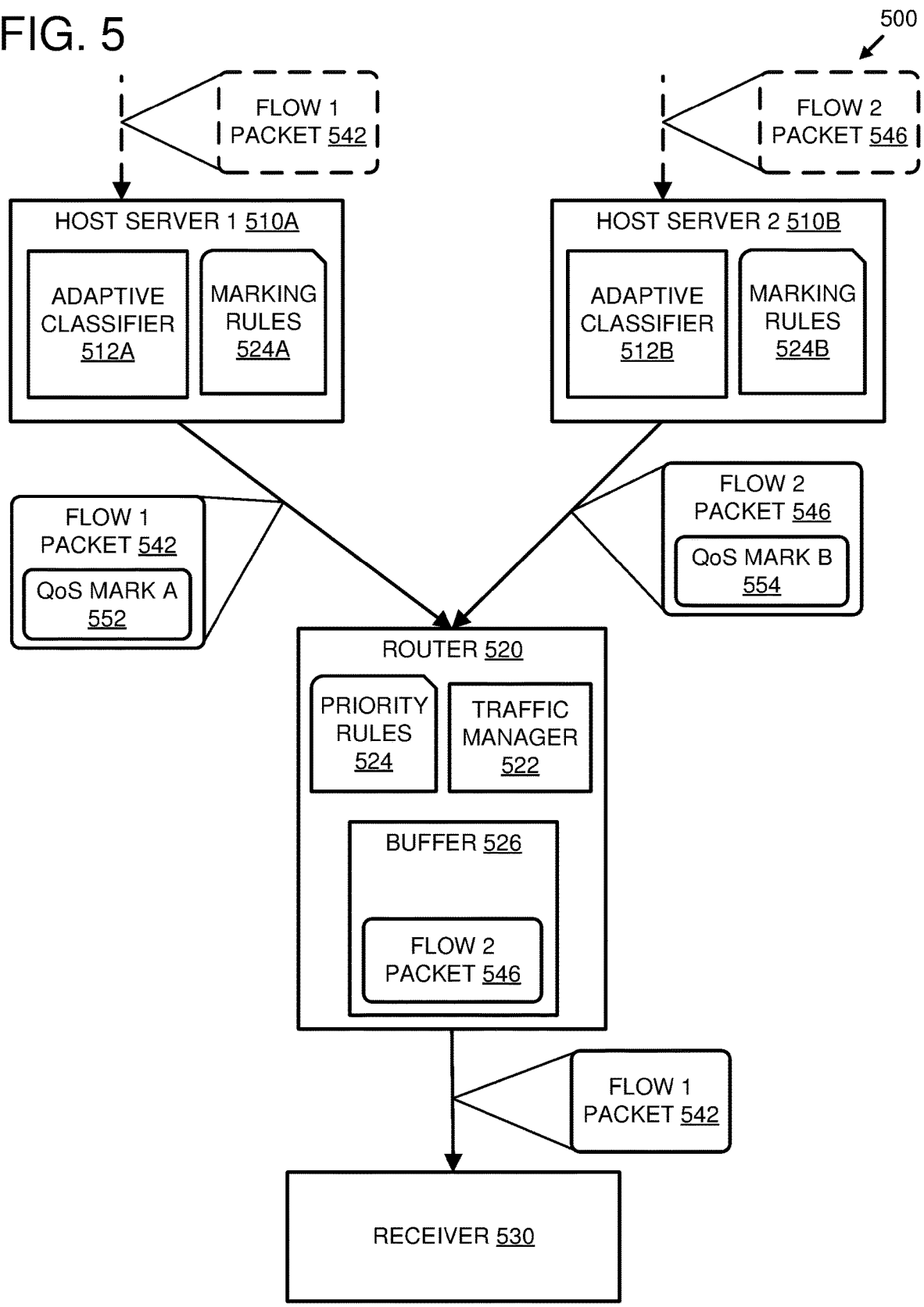
FIG. 5 is an example system diagram illustrating multiple host servers configured to adaptively classify packets for multiple data flows and a router configured to prioritize the packets of the multiple data flows based on the classifications.

FIG. 5 is a diagram illustrating an example system 500 comprising two host servers 510A-B comprising adaptive classifiers 512A-B configured to classify packets in separate data flows, and a router 520 configured to receive packets from hosts 510A-B and to prioritize transmission of the packets received from both host servers.

The host server 510A comprises the adaptive classifier 512A and marking rules 524A. The adaptive classifier 512A can use the marking rules 524A when applying QoS markings to packets in an example data flow "flow 1." The marking rules 524A can specify various QoS markings to apply to packets in the data flow "flow 1" based on a duration of the data flow, an amount of data transmitted in the data flow, or a combination thereof. For example, using the marking rules 524A, the adaptive classifier 512A applies a QoS marking A 552 to a packet 542 before the packet 542 is transmitted to the router 520. In some embodiments, a host server can comprise multiple adaptive classifiers that apply QoS markings to packets in different data flows.

Packets in the data flow "flow 1" can be created by the host server 510A or, optionally, received by the host server 510A from another computing device via a network connection.

The host server 510B comprises the adaptive classifier 512B and marking rules 524B. The adaptive classifier 512B can use the marking rules 524B when applying QoS markings to packets in an example data flow "flow 2." The marking rules 524B can specify various QoS markings to apply to packets in the data flow "flow 2" based on a duration of the data flow "flow 2," an amount of data transmitted in the data flow "flow 2," or a combination thereof. For example, using the marking rules 5124B, the adaptive classifier 512B applies a QoS marking B 552 to a packet 546 before the packet 546 is transmitted to the router 520.

Packets in the data flow "flow 2" can be created by the host server 510B or, optionally, received by the host server 510B from another computing device via a network connection.

The various QoS markings and the marking rules 524A-B can be specified by a system administrator (not shown). The administrator can specify the available QoS markings and the marking rules 524A-B ahead of time during a configuration of the host servers 510A-B. In a different or further embodiment, the available QoS markings and the marking rules 524A-B can be specified and/or edited while the host servers 510A-B are operating.

The router 520 is configured to receive packets from the host servers 510A-B. A traffic manager 522 is configured to prioritize transmission of the received packets to a receiver 530 based on the QoS markings applied to the packets by the adaptive classifiers 512A-B. The traffic manager 522 can use priority rules 524 when determining the priorities of the received packets. The priority rules 524 can specify relative priorities of the various QoS markings. The traffic manager 522 can use these relative priorities to determine a transmission order for pending packets.

For example, the priority rules 524 can specify that the QoS marking A 552 has a higher priority than the QoS marking B 554. Based on this, the traffic manager 522 can prioritize transmission of the packet 542 over transmission of the packet 546. Consequently, the packet 542 can be transmitted to the receiver 530, while the packet 546 is stored in a buffer 526 for transmission at a later time.

Figure 6:
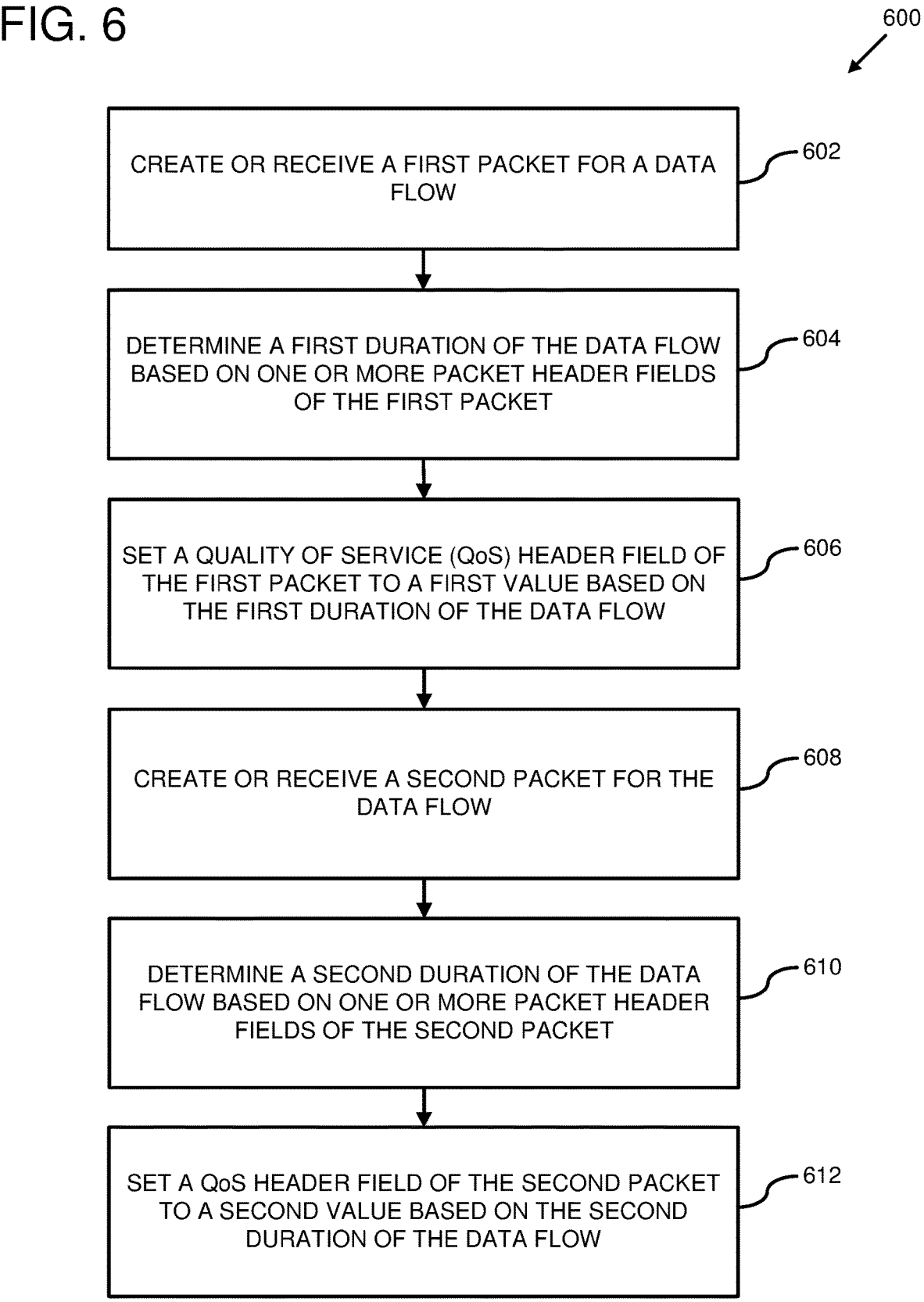
FIG. 6 is a flowchart of an example method of adaptive quality of service marking using packet header fields.

FIG. 6 is a flowchart of an example method 600 of adaptive QoS marking using packet header fields.

At 602, a first packet for a data flow is created or received. The "first packet" is not necessarily the initial packet for the data flow. Other packets for the data flow may have been created or received before the "first packet." The packets in the data flow, including the first packet at 602 and the second packet at 608, can be created by an adaptive classifier. Alternatively, the packets can be created by another process running on the same host server as the adaptive classifier and transmitted to the adaptive classifier by that process. Alternatively, the packets can be created by another originator server and transmitted to a host server comprising the adaptive classifier.

At 604, a first duration of the data flow is determined based, at least in part, on one or more header fields of the first packet. For example, the first packet can contain a packet number header field that can be used to determine a number of packets that have been transmitted in the data flow. The first packet can contain a timestamp that can be used to determine an age of the data flow.

The data flow to which the first packet belongs can be identified by one or more header fields of the first packet. For example, header fields containing source and/or destination identifiers can be used to distinctly identify data flows. The header fields of the first packet can be based on one or more protocols used to transmit the packets in the data flow.

Figure 7:
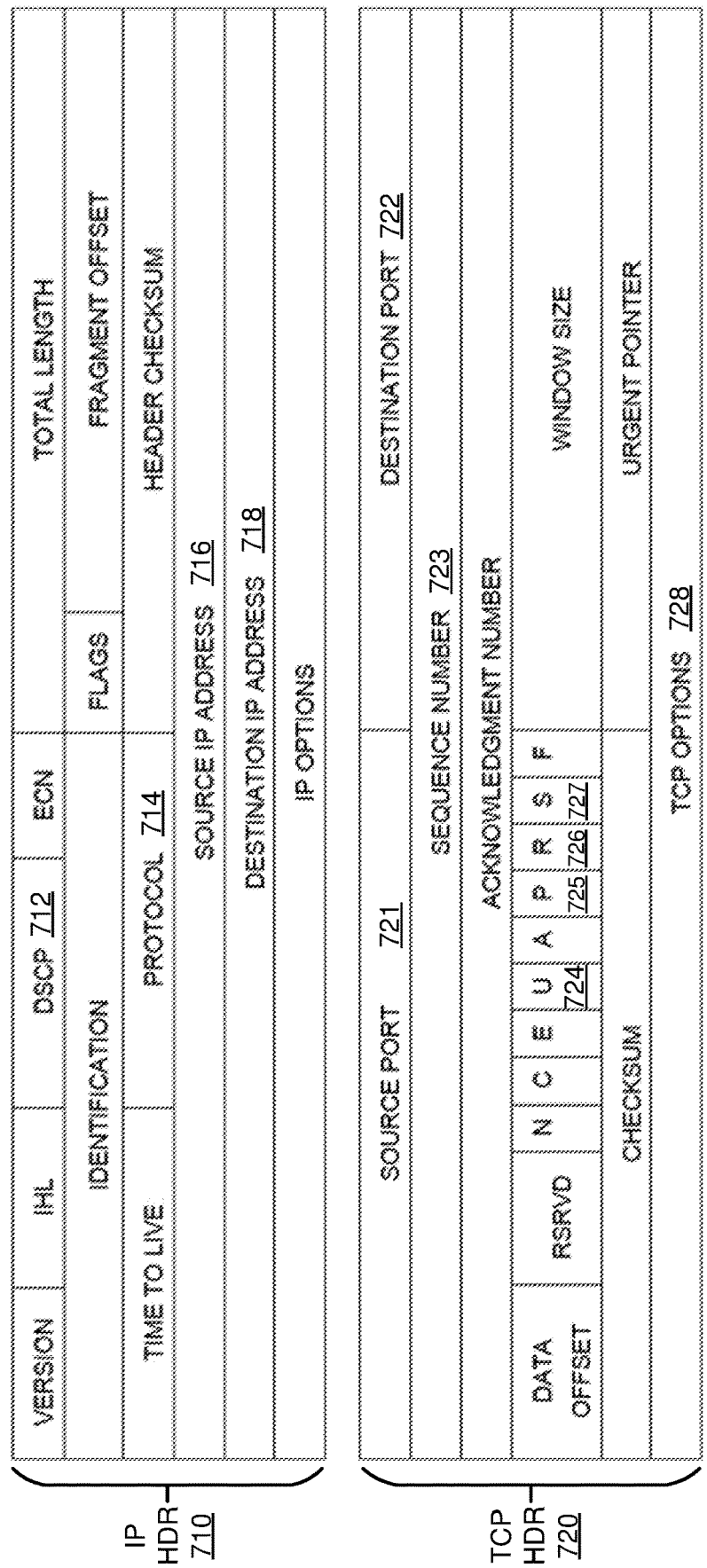
FIG. 7 is a diagram depicting example packet headers that can be used in adaptive quality of service marking.

Turning briefly to FIG. 7, an example IP datagram header 710 and an example TCP segment header 720 are shown. In embodiments where packets in the data flow are transmitted using the Internet Protocol Suite, the first packet can comprise headers such as the IP header 710 and the TCP header 720. In such embodiments, the data flow can be identified using a source IP address field 716, a destination IP address field 718, a protocol field 714, a source port field 721, a destination port field 722, or any combination thereof.

The duration of the data flow can be determined using a sequence number field 723. When a SYN flag 727 is set (i.e., has a value of one), the sequence number field 723 can contain a randomly selected initial sequence number (ISN) for the data flow. When the SYN flag 727 is clear (i.e., has a value of zero), the sequence number field 723 can contain an accumulated sequence number of the first data byte in the TCP segment associated with the TCP header 720. When a packet in the data flow is received with a sequence number field containing an ISN for the data flow, the ISN can be stored in association with the data flow. If the first packet of method 600 has a value for the SYN flag 727 that is clear, then the duration of the data flow can be determined by calculating a difference between the value of the first packet's sequence number field 723 and the ISN of the data flow.

The TCP sequence number field 723 has a size of 32 bits, making the largest possible TCP sequence number $2^{32}$. Once the maximum sequence number is reached, the sequence number for the next data byte loops back to zero. A loop-back (also referred to as a "wrapped sequence number") can be detected using a timestamp in a TCP options field 728. Alternatively, a loop-back indicator can be stored in association with the data flow. In scenarios where sequence number loop-backs are possible, the timestamp and/or loop-back indicator can be used in combination with the ISN and the value in the first packet's sequence number field 723 to determine the first duration of the data flow.

In some embodiments, the duration of the data flow can be determined using a timestamp in the TCP options field 728 instead of the sequence number field 723. A difference can be calculated between the timestamp in the TCP options field 728 and an initial timestamp associated with the data flow. Such an initial timestamp can be created or received when an initial packet in the data flow is received. The difference can represent the duration of the data flow in clock time units, such as milliseconds.

In some embodiments, a combination of clock time and data transmission amount can be used to determine the duration of the data flow. For example, given an age of the data flow in clock time units, and an amount of data transmitted in the data flow, a rate of data transmission per unit of time can be determined and used as the duration of the data flow.

Returning to FIG. 6, at 606, a QoS header field of the first packet is set to a first QoS value based on the first duration of the data flow. The first QoS value can be determined by comparing the first duration to a specified threshold. For example, the first QoS value can be selected if the first duration is less than the specified amount. In some embodiments, the first QoS value is selected when the first duration is greater than or equal to the specified amount, but less than a second specified amount. Additional header field values, such as source identifiers, destination identifiers, and protocol identifiers, can be considered as well. The first QoS value can be a textual or numerical value.

In some embodiments, one or more header fields of the first packet can be used to give the first packet a different QoS value than would otherwise be selected based on the first duration of the data flow. For example, in a scenario where the first packet contains a TCP header, certain TCP flag fields, such as an URG flag 724, a PSH flag 725, a RST flag 726, and a SYN flag 727 can indicate that the packet should be given a high transmission priority. If one or more of these TCP flags are set on the first packet, the QoS value selected as the first QoS value may have a higher priority than the QoS value that would have been selected based on the first duration of the data flow alone.

In embodiments where packets in the data flow are transmitted using the Internet Protocol Suite, the first QoS value can be set in a differentiated services packet header field, such as a DSCP IP header field 712, illustrated in FIG. 7. The IP header 710, comprising the DSCP field 712, is a header for an IP version 4 (IPv4) datagram. For packets transmitted using the IP version 6 (IPv6) protocol, the first QoS value can be set in the six most-significant bits of the IPv6 traffic class header field (not shown).

The first value in the QoS header field of the first packet can be read by a router that receives the first packet and used by the router to prioritize the transmission of the first packet to the first packet's destination.

At 608, a second packet for the data flow is created or received. Other packets may have been created or received for the data flow between receipt of the first packet and receipt of the second packet. The second packet may be created or received in a similar manner as the first packet. At 610, a second duration of the data flow is determined based on one or more packet header fields of the second packet. The second duration can be determined in a similar manner as the first duration.

At 612, a QoS header field of the second packet is set to a second QoS value based on the second duration of the data flow. In some embodiments, the second QoS value is different from the first QoS value. In cases where the first duration is less than a specified amount, the second duration can be greater than or equal to the specified amount and, thus, result in the selection of a different QoS value for the second QoS value. In cases where the first duration is greater than or equal to a first specified amount but less than a second specified amount, a different QoS value can be selected for the second QoS value if the second duration is greater than or equal to the second specified amount. The QoS header field of the second packet can be the same header field as the QoS header field used for the first packet.

The second value in the QoS header field of the second packet can be read by a router that receives the second packet. The router can use the second value to prioritize the transmission of the second packet to the second packet's destination. In scenarios where the second QoS value is different from the first QoS value, the second packet can have a different transmission priority than the first packet.

Figure 8:
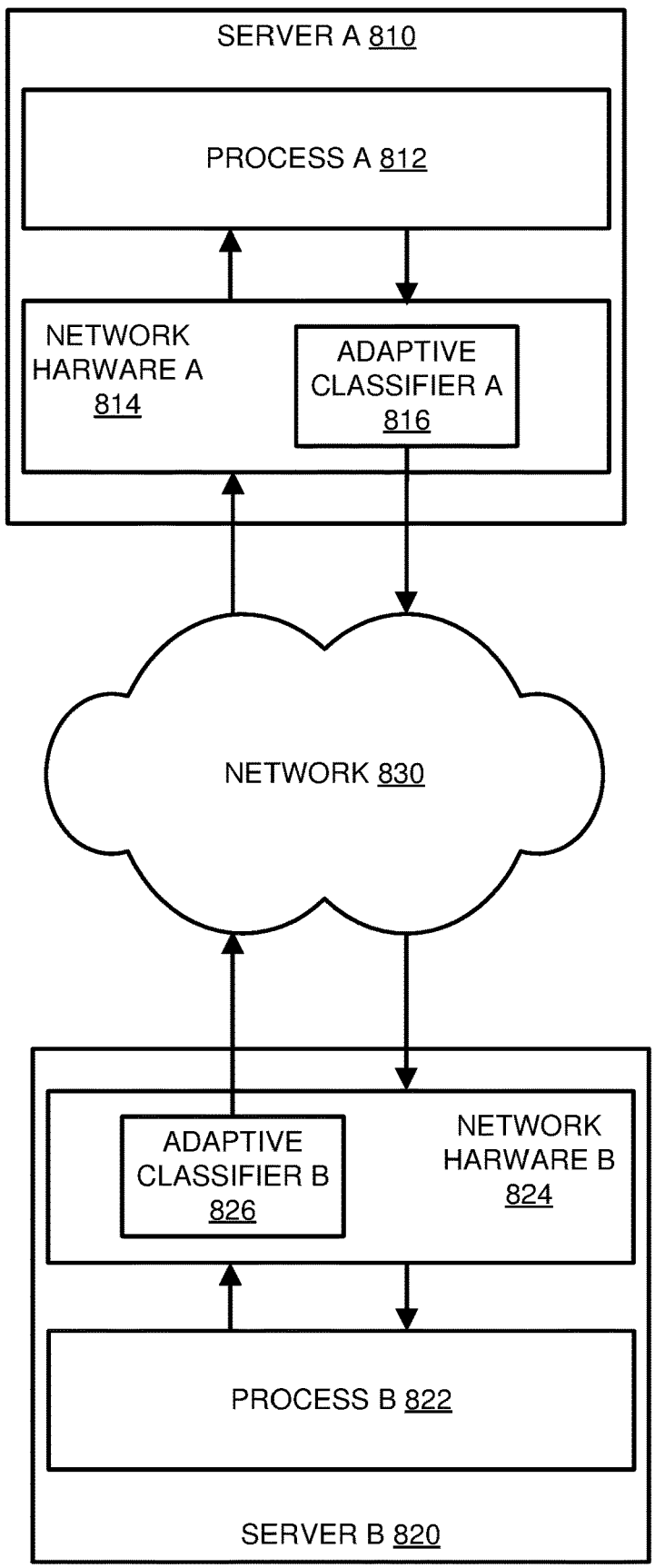
FIG. 8 is an example system diagram illustrating adaptive classifiers on two servers engaged in bi-directional communication.

FIG. 8 is a diagram illustrating an example system 800 comprising two servers configured to use adaptive classifiers in bi-directional communication over a network 830.

The system 800 comprises a server 810 comprising a process 812 configured to transmit and receive data via network hardware 814. In some embodiments, the process 812 can be a software process, such as an operating system or an application.

The network hardware 814 is configured to create packets containing the data received from the process 812 and to transmit the created packets to a server 820 in a first data flow via the network 830. The network hardware 814 is also configured to receive packets in a second data flow from the server 820 via the network 830. The network hardware 814 is configured to extract data from the received packets and transmit the extracted data to the process 812.

The network hardware 814 comprises an adaptive classifier 816. In example system 800, the adaptive classifier 816 is part of the network hardware 814. For example, the network hardware 814 can be a network interface card (NIC) that includes the adaptive classifier 816 in either hardware or software. However, it is also possible for the adaptive classifier 816 to be implemented partially or completely as a software process running on one or more processors on the server 810.

The adaptive classifier 816 is configured to track packets created by the network hardware 814 and to mark the packets at various transmission priority levels based on a number of packets transmitted in the data flow. For example, the adaptive classifier 816 can mark a packet at a first transmission priority level when a packet number of the packet is less than or equal to a threshold number. When a packet number of a packet exceeds the threshold number, the adaptive classifier 816 can mark the packet at a second transmission priority level. The packets in the first data flow are transmitted to the server 820 over the network 830 based on the marked transmission priority levels of the packets.

In some embodiments, the threshold number is specified by a user or system administrator. In other embodiments, the threshold number is specified by the process 812. For example, the process 812 may know an amount of data, or an average amount of data, that is required to set up a communication connection with a remote server, such as the server 820. The process 812 can provide this amount, or average amount, to the adaptive classifier 816 as the threshold number. In such a scenario, data transmitted in the data flow up to the amount necessary to set up a remote connection can be given one transmission priority and data transmitted after the remote connection is established can be given a different transmission priority.

The server 820 comprises a process 822 configured to transmit and receive data via network hardware 824. In some embodiments, the process 822 can be a software process, such as an operating system or an application.

The network hardware 824 is configured to create packets containing the data received from the process 822 and to transmit the created packets to the server 810 in a second data flow via the network 830. The network hardware 824 is also configured to receive packets in the first data flow from the server 810 via the network 830. The network hardware 824 is configured to extract data from the received packets and transmit the extracted data to the process 822.

The network hardware 824 comprises an adaptive classifier 826. In the example system 800, the adaptive classifier 826 is part of the network hardware 824. For example, the network hardware 824 can be a NIC that includes the adaptive classifier 826 in either hardware or software. However, it is also possible for the adaptive classifier 826 to be implemented partially or completely as a software process running on the server 820.

The adaptive classifier 826 is configured to track packets created by the network hardware 824 and to mark the packets at various transmission priority levels based on a number of packets transmitted in the second data flow. For example, the adaptive classifier 826 can mark a packet at a first transmission priority level when a packet number of the packet is less than or equal to a second threshold number. When a packet number of a packet exceeds the second threshold number, the adaptive classifier 826 can mark the packet at a second transmission priority level. The second threshold number can be the same number as the first threshold number used by the adaptive classifier 816. Alternatively the second threshold number and the first threshold number can be different numbers. The packets in the second data flow are transmitted to the server 810 over the network 830 based on the marked transmission priority levels of the packets. The transmission priority levels of the packets in the second data flow can be the same as, or different from, the transmission priority levels of the packets in the first data flow.

In some embodiments, the second threshold number is specified by a user or system administrator. In other embodiments, the second threshold number is specified by the process 822. For example, the process 822 may know an amount of data, or an average amount of data, that is required to set up a communication connection with a remote server, such as the server 810. The process 822 can provide this amount, or average amount, to the adaptive classifier 826 as the second threshold number. In such a scenario, data transmitted in the second data flow up to the amount necessary to set up a remote connection can be given one transmission priority and data transmitted after the remote connection is established can be given a different transmission priority.

Figure 9:
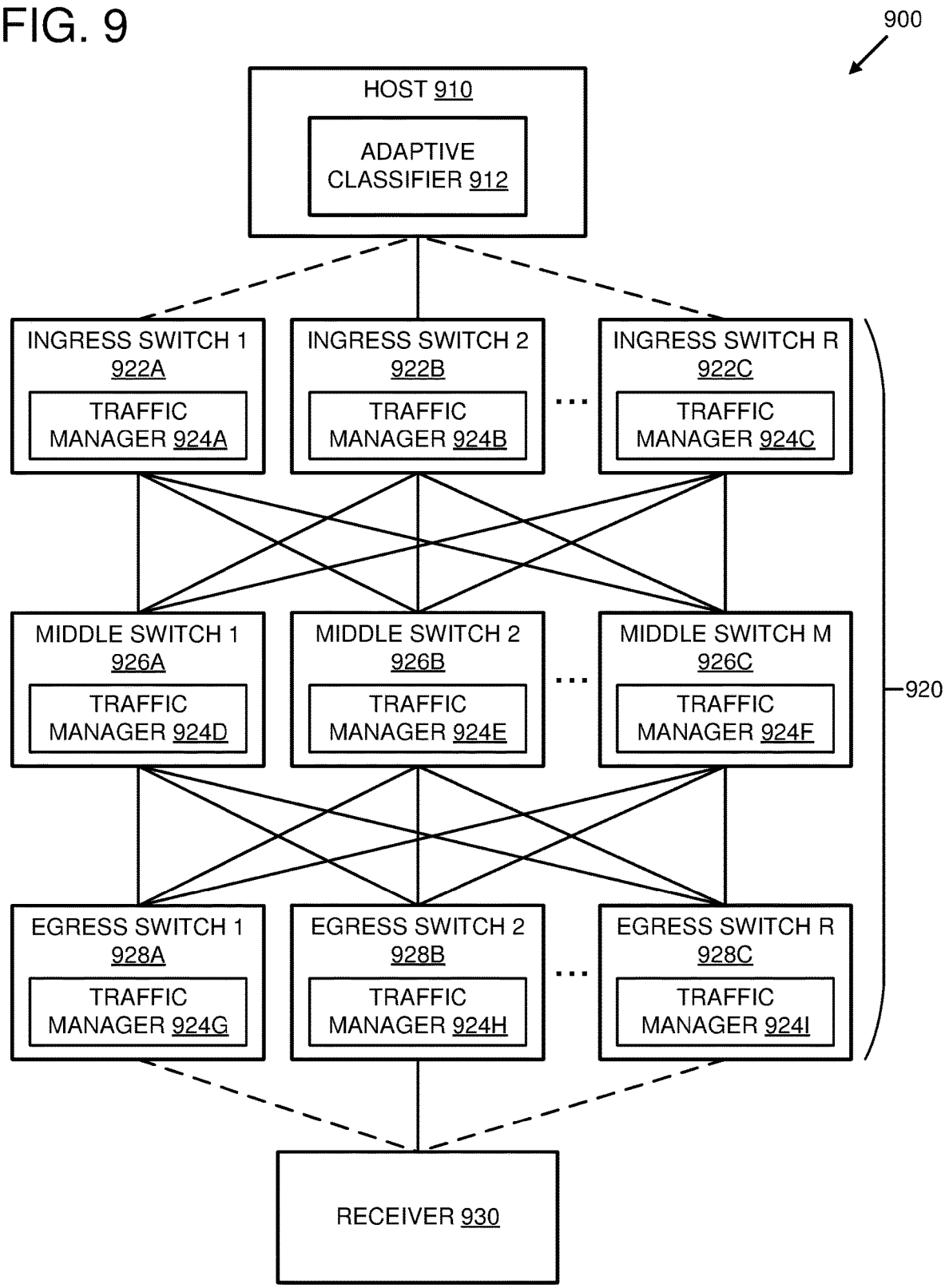
FIG. 9 is an example system diagram illustrating a host, with an adaptive classifier, and a receiver engaged in communication via a multistage switching network.

FIG. 9 is a diagram illustrating an example system 900 comprising a host 910 engaged in communication with a receiver 930 via a multistage switching network 920.

The multistage switching network comprises R ingress switches 922A-C, M middle switches 926A-C, and R egress switches 928A-C. Each ingress switch 922A-C is connected to each middle switch 926A-C and configured to transmit packets to each middle switch 926A-C via the connections. Each middle switch 926A-C is connected to each egress switch 928A-C and configured to transmit packets received from one or more of ingress switches 922A-C to each egress switch 928A-C via the connections. In some embodiments, the multistage switching network 920 can be a Clos network, wherein each of the R ingress switches 922 has N inputs and M outputs, each of the M middle switches 926 has R inputs and R outputs, and each of the R egress switches 928 has M inputs and N outputs.

The host 910 is configured to transmit packets in a data flow to the receiver 930 via the multistage switching network 920. The host 910 is connected to one or more of the ingress switches 922A-C and transmits packet in the data flow via the one or more connected ingress switches. The receiver 930 is connected to one or more of the egress switches 928A-C and receives the transmitted packets via the one or more connected egress switches.

The host 910 comprises an adaptive classifier 912. The adaptive classifier 912 is configured to track metadata about the data flow, such as an age of the data flow and/or an amount of data transmitted in the data flow, and to assign various QoS classifications to the packets in the data flow, based on the data flow metadata, before they are transmitted to one or more of the ingress switches 922A-C. As more packets are transmitted in the data flow, the data flow metadata can change (e.g., the age and/or amount of data transmitted in the data flow can increase). Different QoS classifications can be assigned to subsequent packets based on the changing metadata.

The switches 922A-C, 926A-C, and 928A-C comprise traffic managers 924A-I. The traffic managers are configured to determine per-hop behaviors for packets using the QoS classifications assigned to the packets by the adaptive classifier 912. A per-hop behavior for a packet can comprise a transmission priority for the packet and/or a target downstream switch for the packet's next "hop."

A "hop" in this context refers to a transmission in a series of transmissions that route a packet through a network from its source to its destination. For example, a packet can be transmitted from the host 910 to the ingress switch 922B, from the ingress switch 922B to the middle switch 926A, from the middle switch 926A to the egress switch 928B, and from the egress switch 928B to the receiver 930. Each transmission in such a sequence of transmissions constitutes a "hop" from one node in the network to another node in the network. In the example system 900, a packet can receive a different per-hop behavior, based on its QoS classification, from a traffic manager 924 at each switch in the switching network 920 that receives the packet. Since different packets in the data flow can be assigned different QoS classifications by the adaptive classifier 912, the different packets in the data flow can receive different per-hop behaviors from the traffic managers 924.

In some embodiments, the host 910 and the receiver 930 are in different data centers. In such embodiments, the multistage switching network 920 is located in one data center and another switching network (not shown) can be located in the other network. In such embodiments, packets can be transmitted between the data centers via interconnected edge routers (not shown) that are connected to the separate switching networks within the separate data centers.

For example, in a first data center, the host 910 can transmit packets to one or more of the ingress switches 922A-C. Ultimately, the packets can be transmitted from one or more of the egress switches 928A-C to an edge router in the first data center. The edge router in the first data center can transmit the packets to another edge router in a second data center. The edge router in the second data center can transmit the packets to another switching network in the second data center, and the receiver 930 in the second data center can receive the packets from the other switching network.

Figure 10:
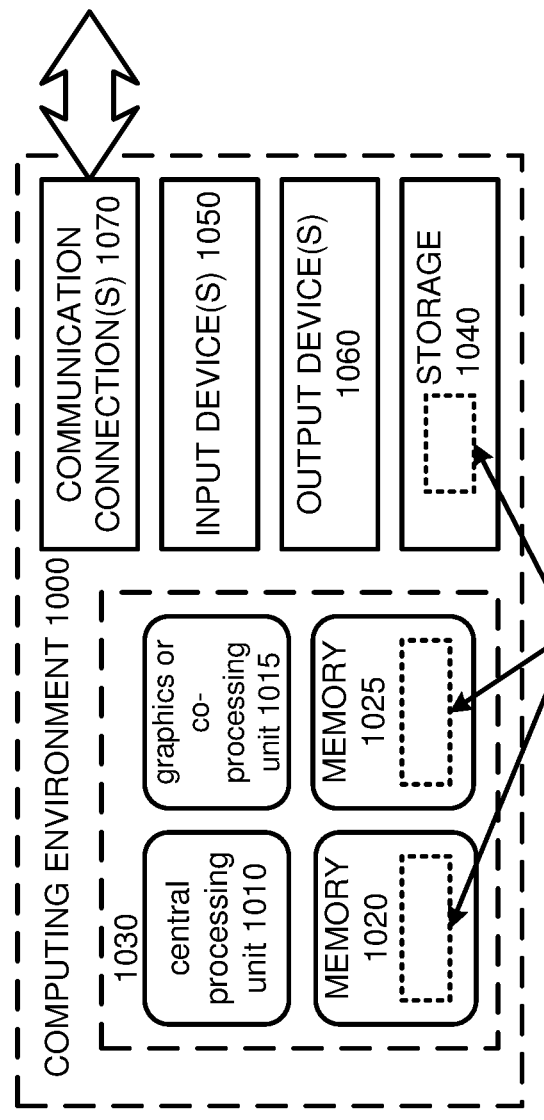
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

Computing environment 1000 can be used to implement a host, router, or receiver, in any of the examples described herein.

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.*The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method, comprising:
   tracking network packets being transferred in a network session;
   based on the tracking, determining that a first packet in the network session is transferred in a first phase of the network session, wherein the first phase is a session establishment phase;
   based on the determining that the first packet is transferred in the session establishment phase of the network session, marking, by a host computing device, the first packet of the network packets in the network session at a first priority level that is a higher priority level than a second priority level associated with a second phase that is not the session establishment phase, wherein marking the first packet at the first priority level comprises modifying the first packet;
   transmitting the modified first packet by the host computing device to a switch which routes the modified first packet in a switching network based on the first priority level;
   subsequently, based on the tracking, determining that a second packet in the network session is transferred in the second phase of the network session;
   based on the determining that the second packet is transferred in the second phase of the network session, marking, by the host computing device, the second packet in the network session at the second priority level that is a lower priority level than the first priority level, and wherein marking the second packet at the second priority level comprises modifying the second packet;
   transmitting the modified second packet by the host computing device to the switch which routes the modified second packet in a switching network based on the second priority level; and
   wherein the tracking further comprises:
      monitoring a packet number transmitted in the network session,
      comparing the packet number to a threshold number, and
      wherein the marking of the second packet at the second priority level occurs after the packet number exceeds the threshold number, and
      wherein the threshold number is provided by an application that generated data contained in some of the network packets transferred in the network session.

2. The method of claim 1, wherein the tracking includes monitoring a time difference between a first packet transferred in the network session and subsequent packets in the network session.

3. The method of claim 1, wherein the marking the first packet at the first priority level includes modifying header information of the first packet to designate the first packet as having the first priority level.

4. The method of claim 1, wherein the tracking of the packet transfer occurs on a network interface card on an originating server.

5. The method of claim 1, wherein the tracking of the packet transfer occurs on a firewall computer that receives the network packets.

6. The method of claim 1, wherein the modified first packet with the first priority level is given a higher priority by the switch than the modified second packet with the second priority level.

7. The method of claim 1, wherein:
   the tracking comprises decrementing a value of a counter associated with the network session as the network packets are transferred in the network session; and
   wherein the marking of the second packet at the second priority level occurs when the value of the counter is less than a specified threshold.

8. A system comprising a host computing device and a network routing device, wherein:
   the host computing device is configured to:
      track network packets being transferred in a network session,
      based on the tracking, determine that a first packet in the network session is transferred in a first phase of the network session, wherein the first phase is a session establishment phase,
      based on the determining that the first packet is transferred in the session establishment phase of the network session, mark the first packet in the network session at a first priority level, wherein the first priority level is a higher priority level than a second priority level associated with a second phase of the network session that is not a session establishment phase, wherein marking the first packet at the first priority level comprises modifying the first packet,
      transmit the modified first packet to the network routing device,
      based on the tracking, determine that a second packet in the network session is transferred in the second phase of the network session, based on the determining that the second packet is transferred in the second phase of the network session, mark the second packet of the network packets at the second priority level that is a lower priority level than the first priority level, and wherein marking the second packet at the second priority level comprises modifying the second packet, and transmit the modified second packet to the network routing device;

the network routing device is configured to:

receive the modified first packet and the modified second packet from the host computing device, route the modified first packet in a switching network based on the first priority level, and route the modified second packet in the switching network based on the second priority level; and wherein the tracking further comprises:

monitoring a packet number transmitted in the network session, comparing the packet number to a threshold number, and wherein the marking of the second packet at the second priority level occurs after the packet number exceeds the threshold number, and wherein the threshold number is provided by an application that generated data contained in some of the network packets transferred in the network session.

9. The system of claim 8, wherein the tracking includes monitoring a time difference between a first packet transferred in the network session and subsequent packets in the network session.

10. One or more non-transitory computer-readable media storing computer-readable instructions that, when executed by a processor, cause the processor to perform operations, the operations comprising:

tracking network packets being transferred in a network session;

based on the tracking, determining that a first packet in the network session is transferred in a first phase of the network session, wherein the first phase is a session establishment phase;

based on the determining that the first packet is transferred in the session establishment phase of the network session, marking the first packet of the network packets at a first priority level that is a higher priority level than a second priority level that is associated with a second phase of the network session that is not a session establishment phase, wherein marking the first packet at the first priority level comprises modifying the first packet;

transmitting the modified first packet to a switch which routes the modified first packet in a switching network based on the first priority level;

subsequently, based on the tracking, determining that a second packet in the network session is transferred in the second phase of the network session;

based on the determining that the second packet is transferred in the second phase of the network session, marking the second packet of the network packets at the second priority level that is a lower priority level than the first priority level, and wherein marking the second packet at the second priority level comprises modifying the second packet;

transmitting the modified second packet to the switch which routes the modified second packet in the switching network based on the second priority level; and wherein the tracking further comprises:

monitoring a packet number transmitted in the network session, comparing the packet number to a threshold number, and wherein the marking of the second packet at the second priority level occurs after the packet number exceeds the threshold number, and wherein the threshold number is provided by an application that generated data contained in some of the network packets transferred in the network session.

11. The one or more non-transitory computer-readable media of claim 10, wherein the marking the first packet at the first priority level comprises modifying header information of the first packet to designate the first packet as having the first priority level.

12. The one or more non-transitory computer-readable of claim 10, wherein:

packets having the first priority level, including the modified first packet, are given higher priority by the switch than packets with the second priority level, including the modified second packet.

* * * * *

UNITED STATES PATENT AND TRADEMARK OFFICE
CERTIFICATE OF CORRECTION

PATENT NO. : 11,240,157 B1  
APPLICATION NO. : 15/059017  
DATED : February 1, 2022  
INVENTOR(S) : Stephen Callaghan Page 1 of 1

It is certified that error appears in the above-identified patent and that said Letters Patent is hereby corrected as shown below:

In the Claims

Column 22, Line 39, "computer-readable of" should read --computer-readable media of--.

Signed and Sealed this
Tenth Day of May, 2022

Katherine Kelly Vidal
*Director of the United States Patent and Trademark Office*